United States Patent [19]

Getman

[11] 4,188,768
[45] Feb. 19, 1980

[54] APPARATUS FOR PRODUCING FROZEN CONFECTIONS

[75] Inventor: Harlan R. Getman, Toledo, Ohio

[73] Assignee: Vroman Foods, Inc., Toledo, Ohio

[21] Appl. No.: 918,672

[22] Filed: Jun. 23, 1978

Related U.S. Application Data

[62] Division of Ser. No. 755,180, Dec. 29, 1976, abandoned.

[51] Int. Cl.² ............................ A23G 9/28; B65B 1/04
[52] U.S. Cl. ...................................... 53/282; 426/282; 426/306
[58] Field of Search .................. 53/282; 426/139, 282, 426/306

[56] References Cited

U.S. PATENT DOCUMENTS

| 2,106,893 | 2/1938 | Krein | 426/282 |
|---|---|---|---|
| 2,965,499 | 12/1960 | Wise | 426/101 |
| 3,170,568 | 2/1965 | Carter | 426/139 |
| 3,171,367 | 3/1965 | Carter et al. | 426/306 |
| 3,470,831 | 10/1969 | Von Drachenfels | 426/306 |
| 4,024,694 | 5/1977 | Cooper et al. | 53/282 |

Primary Examiner—Robert D. Baldwin
Attorney, Agent, or Firm—Harry O. Ernsberger

[57] ABSTRACT

The disclosure embraces a method of and apparatus for producing or forming frozen confections or desserts of the comestible cone type in which cone assemblies, each comprising a comestible sugar cone enclosed within a protective paper cone-shaped shell, are processed through successive method steps in which a chocolate composition is atomized and delivered into each comestible cone forming an impervious chocolate coating as a moisture barrier, the comestible cone tamped into the protective shell, a comestible ingredient such as ice cream, ice milk, sherbet or the like delivered into each cone assembly and the confection or product subjected to reduced temperature to freeze, congeal or render solid the ice cream and other comestible constituents in the end product.

9 Claims, 5 Drawing Figures

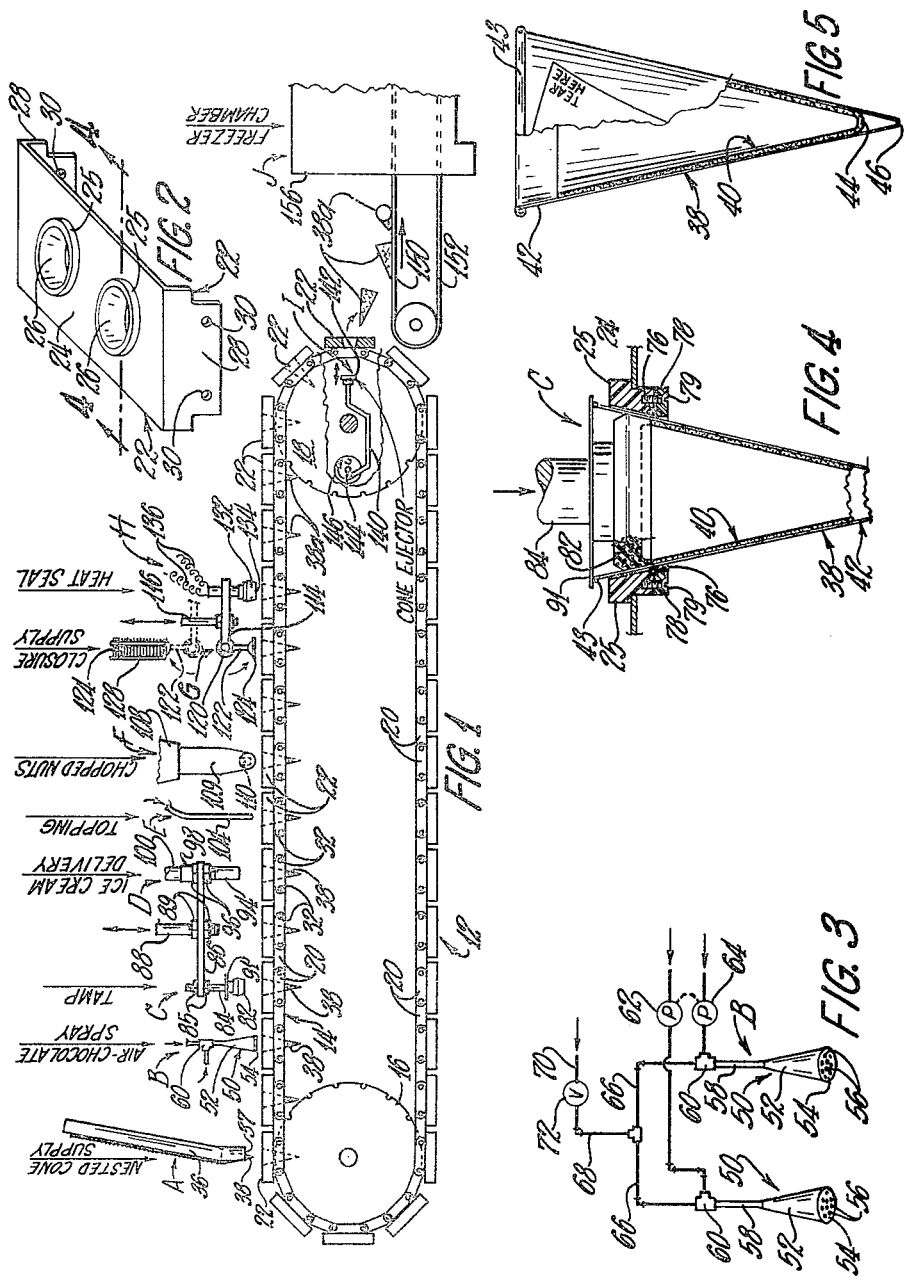

APPARATUS FOR PRODUCING FROZEN CONFECTIONS

This is a division of my pending application Ser. No. 755,180 filed Dec. 29, 1976, now abandoned.

The invention relates to apparatus for producing a frozen confection or dessert particularly a frozen product of the character wherein a comestible cone such as a sugar cone is enclosed in a paper shell and supporting or containing a dairy product in a semifrozen or viscous condition such as ice cream or ice milk composition or the like, the shell closed by a cover member, and the end product subjected to freezing temperatures.

Frozen confections, desserts or products of this character have heretofore been made but such products have certain characteristics which are annoying or disconcerting to the ultimate consumer. Products of this character may be stored for periods of time during which moisture from the ice cream or ice milk tends to penetrate or permeate the sugar cone. When the products are stored in automatic defrosting refrigeration cabinets, the moisture penetration of the sugar cones may be quite severe and the sugar cones become soggy very rapidly.

It is desirable to apply a topping of chocolate composition in liquid condition on the portion of the dairy ingredient above the comestible sugar cone, but it is found that the liquid chocolate tends to flow downwardly between the exterior surface of the comestible sugar cone and the interior surface of the paper cone or shell. In such a product, when the paper shell is removed by the consumer, a film or coating of chocolate remains on the exterior surface of the comestible sugar cone which is undesirable and renders the product unattractive and difficult for the consumer to handle.

The present invention embraces apparatus for forming or processing a frozen dessert or product wherein a comestible crisp cone contained within a cone-shaped paper shell supports a semifrozen dairy constituent or comestible and liquid chocolate composition sprayed by air under pressure into the interior surface of the comestible cone to provide a film or coating of the chocolate in the interior surface of the comestible cone which is substantially impervious to moisture so that the cone does not become soggy but retains its crisp or substantially rigid characteristics to adequately support the dairy comestible.

Another object of the invention resides in apparatus for exerting pressure on or tamping a comestible sugar cone into a paper cone or shell forming a seal between the sugar cone and the paper cone or shell whereby a topping of chocolate or the like on the dairy constituent is prevented from flowing between the adjacent surfaces of the sugar cone and the paper cone or shell so that there is no chocolate on the exterior surface of the sugar cone when the paper cone is removed by the consumer.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a semischematic side elevational view of an apparatus for forming and processing paper-encased comestible cones containing frozen dairy constituents or desserts and illustrating successive method steps or stations of the process;

FIG. 2 is an isometric view of one of the links of an endless conveyor for supporting the comestible cones and surrounding paper shells;

FIG. 3 is a semischematic view illustrating the arrangement for spraying liquid chocolate into the comestible cones at a first chocolate-applying station;

FIG. 4 is a sectional view through a cone assembly supporting link or member of the endless conveyor belt, the section being taken on the line 4—4 of FIG. 2, the view including the cone-tamping arrangement at a tamping station, and FIG. 5 is a longitudinal view partly in section on a reduced scale of a cone assembly showing a comestible cone nested within a paper cone or shell.

While the apparatus of the invention has particular utility in the formation and processing of a frozen comestible product or frozen dessert of the character preferably embodying a comestible sugar cone disposed in a paper shell and containing a filling of ice cream, ice milk or the like, it is to be understood that the apparatus may be used in producing or processing a similar product embodying an edible container of frusto-conical shape.

Referring initially to FIG. 1 of the drawings, there is illustrated semischematically an endless belt conveyor and the several stations at which method steps are performed in producing the frozen end product. Mounted upon a suitable frame (not shown) is an endless conveyor 12 of articulate construction engaging pairs of sprockets 16 and 18 of conventional motive means (not shown) controlled to provide a periodically interrupted or step-by-step movement of the endless conveyor 12.

Links 20 of the conveyor 12 are connected with cone-supporting plates or members 22, one of which is shown in detail in FIG. 2. Each of the plates 22 is provided with a planar portion 24 equipped with members or fittings 25 having openings 26 for accommodating and supporting cone assemblies. Each of the plates has depending portions 28 having openings 30 to loosely receive pins or rivets 32 which join the links 20 with the plates 22, the plates providing mounting means for the cone assemblies.

As each member or plate 22 is provided with two positions for receiving cone assemblies, the several stations along the flight 14 of the endless conveyor has dual facilities for performing operations on and filling cones or cone assemblies with comestible ingredients. Reference made herein to instrumentalities or facilities at the several stations in FIG. 1 is intended to mean two substantially identical instrumentalities or facilities positioned in alignment transversely of the conveyor at a station.

The upper flight 14 of the endless conveyor 12 is driven in a right-hand direction as viewed in FIG. 1. The several processing stations are arranged along the upper flight of the conveyor. The conveyor, as previously mentioned, is actuated intermittently so that operations may be performed during the intermittent periods in which the conveyor is not moving.

With particular reference to FIG. 1, the station indicated at "A" provides supplies of cone assemblies 38 which are in nested relation in two tubular magazines or supply tubes 36, the cone assemblies being successively delivered from exit regions 37 of the tubes 36. One of the cone assemblies 38 is illustrated on a reduced scale in FIG. 5 and comprises an inner cone 40 of prebaked edible material providing a comestible crisp sugar cone and an outer cone or shell 42 fashioned of a sheet of paper or the like surrounding or embracing the inner sugar cone 40. The upper rim 43 of the paper cone is fashioned by folding the paper upon itself as is conventional in the manufacture of paper cones.

A person, when about to consume the sugar cone 40 and the frozen ice cream or filling contained therein, grasps the edge of the paper sheet forming the cone 42 at the region of the legend "Tear Here", indicated in FIG. 5, and removes the paper cone. The cone assemblies 38, each comprising two cone components 40 and 42, are nested in the supply magazines 36. As will be seen from FIG. 5, the lower end of the inner sugar cone 40 terminates at a region 44 which is spaced substantially above the tip 46 of the paper cone 42.

When the cone assemblies are in nested relation in the supply tubes 36, the tips 46 of the paper cones engage the inner surface of the tips of the sugar cones 40 so that the contiguous walls of the cone assemblies are in spaced relation whereby a single cone assembly 38 may be discharged from each supply tube 36 into one of the openings 26 of a cone supporting plate 22 of the conveyor.

The delivery of cone assemblies from the supply magazines 36 is accomplished by conventional gating means (not shown) whereby the cone assemblies are successively delivered into the openings in fittings 25 in a plate 22 at each interruption of movement of the conveyor 12. At each intermittent movement of the conveyor 12, the cone assemblies in the cone mounting means or plates 22 are advanced a predetermined distance to successive stations.

The second processing station is indicated at "B" at which a chocolate composition in liquid form is delivered onto the interior surface of the comestible or edible sugar cone 40. The method and means of delivery of the liquid chocolate composition is an important feature of applicant's method in order to provide an impervious coating or film of chocolate on the interior surface of the comestible sugar cone. In order to provide an impervious film or coating of chocolate on the interior surfaces of the sugar cones 40, the liquid chocolate mixed with air under pressure is sprayed at station "B" into the sugar cones.

A semischematic view of the chocolate composition spraying arrangement is illustrated in FIG. 3. Disposed above the upper flight 14 of the conveyor at station "B" spaced from the cone supply tubes 38 are means 50 for spraying the chocolate composition into the interior of the sugar cones 40. The delivery means 50 comprises nozzles or members 52 at the ends of which are plates 54 having delivery orifices 56. The nozzles are in vertical alignment with the cones at station "B" as illustrated in FIG. 1.

The nozzles or nozzle members 52 are connected by tubes 58 with chocolate and air mixing means which are illustrated in the form of tee-shaped fittings 60. As shown in FIG. 3, the chocolate and air mixing means 60 are connected with metering pumps 62 and 64 of conventional construction, the pumps metering successive charges of liquid chocolate composition to the mixing means 60. The mixing means 60 are connected by tubes 66, 68 and 70 with a supply of compressed air.

Valve means 72 is provided which is temporarily opened by timing means (not shown) after each movement of the conveyor 12 to deliver compressed air to the means or members 60 in which the compressed air mixes with the charges of liquid chocolate and sprays droplets or particles of the chocolate into the inner surfaces of the cones 40. The liquid chocolate composition is atomized or diffused into minute droplets or particles by the compressed air and that through this method the particles which are deposited on the interior surfaces of the cones 40 form therein impervious coatings or films of chocolate composition.

It is found that through this method of forming a chocolate composition coating on the interior surface of a sugar cone 40, the coating provides a vapor barrier preventing moisture from penetrating the sugar cone 40 so that the sugar cone does not become soggy but maintains its substantially rigid or crisp characteristics.

While it is not fully understood as to the reason why the spraying of liquid chocolate atomized by compressed air provides an impervious film, coating or lining or chocolate, the delivery of liquid chocolate composition without the compressed air does not result in an impervious film or coating of chocolate on the interior of a sugar cone.

The method includes a step of exerting pressure upon or tamping the comestible or sugar cones 40 into snug engagement with the inner surfaces of the paper cones 42 at a station indicated at C and prior to the delivery of ice cream, ice milk or other similar ingredient in semifrozen or viscous condition into the cone assemblies. An arrangement for exerting pressure upon or tamping a comestible cone into a paper cone is illustrated in detail in FIG. 4.

Each of the annular fittings 25 extends through an opening in a planar portion 24 of a plate 22, a lower portion of each fitting 25 being provided with a recess accommodating an O-ring 76 of rubber or other resilient material which is secured in engagement with each fitting 25 by a ring or annulus 78 held in position by screws 79 which are threaded into openings in the fittings 25 as shown in FIG. 4.

O-rings 76, being flexible or resilient, are effective to yieldably resist outward expansion of the paper cones 42 when downward pressure or tamping action is exerted on the sugar cone 40.

FIG. 1 illustrates the apparatus at station "C" which includes two pressure exerting means or tamping members 82 mounted upon vertically disposed members or rods 84, the rods being adjustably secured to a horizontally disposed member or bar 86 by means of adjusting nuts 85 received on threaded portions of the rods. The bar 86 is adjustably mounted upon a shaft or member 88, adjustment of the bar 86 being attained by manipulation of nuts 89 on a threaded portion of shaft 88.

Through this arrangement the horizontally disposed member or bar 86 may be adjusted so that the pressure exerting members or tampers 82 may be properly engaged with the upper circumferential edges of the sugar cones 40 at station "C". Metal discs 91 carried by the rods 84 are adapted to engage the rims 43 of the paper cones 42. The tamping members 82 are formed of yieldable or resilient material, such as soft rubber, to avoid crushing or fracturing of the crisp sugar cones 40.

The support or mounting shaft 88 for the tampers 82 is intermittently reciprocated vertically by conventional means in timed relation with the interruptions of movement of the conveyor 12 so that the tampers 82 are moved downwardly into engagement with the sugar cones 40 in registration with the tampers.

The purpose of tamping the sugar cones 40 into contiguous relation with the inner surfaces of the paper cones 42 is to prevent ice cream and chocolate topping delivered into the cone assemblies at succeeding stations from flowing downwardly between contiguous surfaces of the sugar cones 40 and the paper cones 42. Thus, when a person removes the paper cone or shell 42 from a sugar cone 40, there will be no ice cream or chocolate topping on the outer surface of the sugar cone.

The ice cream, ice milk or other similar dessert in a viscous, semifluid or semifrozen condition is delivered into the cone assemblies at station "D". The ice cream delivery means at station "D" are also supported or mounted by the horizontal bar 86 shown in FIG. 1. The ice cream delivery arrangement includes tubes or nozzles 94 preferably adjustably supported on the bar 86 by adjusting nuts 96 on a threaded portion of each of the nozzles or tubes.

The upper extremities of the nozzles or tubes 94 are provided with fittings 98 which are connected by tubes or pipes 100 with a conventional metering device or pump (not shown) which meters successive charges of viscous ice cream, ice milk or the like from a supply for delivery intermittently from the nozzles 94 into the cone assemblies 38 as they are brought into registration with the nozzles by the conveyor 12.

It should be noted from FIG. 1 that the tamping apparatus at station "C" and the ice cream delivery apparatus at station "D" are mounted by the horizontal bar 86 so that a downward movement of the shaft or rod 88 simultaneously tamps two of the sugar cones 40 in their supporting paper cones 42 and lowers the nozzles 94 to effect delivery of ice cream into two cone assemblies 38 in registration with the nozzles 94.

The amount of ice cream delivered into each cone assembly is metered so that the upper level of the ice cream in the cone assemblies is below the rim 43 of the paper cone providing sufficient space to accommodate topping materials delivered into the cone assemblies at stations "E" and "F". Station "E", indicated in FIG. 1, includes two tubular means or tubes 104 for delivering topping such as a chocolate composition in flowable form onto the ice cream delivered into the cone assemblies at station "D" as they are brought into registration with the tubes 104.

The tubes 104 are connected with a conventional metering pump which is connected with a supply of chocolate composition, the pump being intermittently operable in timed relation with movements of the conveyor 12 for delivering metered amounts of the chocolate composition providing a topping onto the ice cream contained in the cone assemblies.

At station "F", indicated in FIG. 1, topping material such as chopped nuts or nut pieces may be delivered onto the chocolate topping on the ice cream in the cone assemblies. Station "F" is inclusive of a hopper 108 containing a supply of chopped nuts or nut pieces and delivery tubes 109. The lower ends of the tubes 109 are provided with nut piece metering and delivering means 110 intermittently rotatable in timed relation with movements of the conveyor 12 for delivering metered amounts of chopped nuts or nut pieces onto the chocolate topping in the cone assemblies in registration with station "F".

The process includes a station "G" at which disc-like covers or closures are applied onto the paper cones of the cone assemblies filled with ice cream and topping materials, and a station "H" for heat sealing the covers or closures onto the rims 43 of the paper cones 42.

As illustrated in FIG. 1, the apparatus at stations "G" and "H" include a horizontally disposed member 114 which is secured to a shaft 116. A tubular element or shaft 120 is journally mounted by the horizontal member 114. Secured to the tubular element or shaft 120 are arms or members 122, the element 120 being adapted for rotative or pivotal movement.

The arms 122 are tubular and a tube (not shown) connected with the hollow shaft 120 is connected with a vacuum pump (not shown). The lower ends of each of the arms 122 are flared providing a surface area to which a closure, cover or disc 124 may be adhered by the vacuum or reduced pressure. The closures 124 are precoated with a thin layer of heat-softenable wax.

Disposed in vertical alignment with each of the arms 122 when the latter are in vertical positions are two magazines 128 adapted to contain and support supplies of the covers or closures 124. The arms 122 are rotatable with the shaft 120, the latter being periodically rotated from one position to another by conventional means in timed relation with the intermittent movements of the conveyor 12.

Upon upward movement of the bar 114 to the broken line position, the shaft 120 is rotated so that the arms 122 are in vertical positions, shown in broken lines in FIG. 1, with the flared portions of the arms adjacent the lowermost covers or closures in the magazines 128. Vacuum or reduced pressure provided by a vacuum pump is communicated to the tubular arms 122 by conventional timing means, the vacuum being effective to withdraw the lowermost covers or closure 124 from the supplies in the magazines 128.

The arms 122 are rotated by the shaft 120 to the position shown in full lines in FIG. 1 with the closures supported by the arms under the influence of the vacuum or reduced pressure. During a period of temporary interruption of movement of the conveyor 12, conventional timing mechanism actuates means to move the shaft or member 116 downwardly which movement engages the covers or closures 124 held by the arms 122 with the rims 43 of the paper cones 42 at station "G".

After engagement of the covers with the paper cones, conventional timing means releases the vacuum or reduced pressure within the tubular arms 122 thereby releasing the covers 124 from engagement with the arms 122. The timing means then energizes conventional means moving the shaft 116, bar 114 and arms 122 upwardly.

Station "H" involves a method step of sealing or adhering the covers or closures 124 on paper cones 42 that are in registration with a sealing arrangement at station "H". In the apparatus illustrated, electrically energizable heating units 132 are mounted on the horizontal bar or member 114, the heaters 132 being energized by an electric current supply through conductors 136.

When the shaft or member 116 is moved downwardly, the heaters 132 are brought into close proximity but out of engagement with the closures, covers or discs 124 on the paper cones in registration with the heating means at station "H". Radiant heat from the electrically-energized heaters 132 softens the wax on the closures or covers to adhere them to the rims 43 of the paper cones. The wax hardens upon movement of the cone assemblies away from the heat sealing station "H". With each upward movement of the bar 114, the electrically energizable heaters 132 are moved upwardly away from the covers or closures on the paper cones.

If desired, the filled cone assemblies may be moved by the conveyor 12 while in vertical position through a conventional prefreezing chamber (not shown) at the right of station "H" before the cone assemblies are ejected from the conveyor.

The filled cone assemblies or end products are advanced by the conveyor 12 by intermittent movements of the conveyor until the cone assemblies with the covers 124 closing the ends are in registration with an ejecting station "I" at which the assemblies are ejected from the conveyor. As schematically shown in FIG. 1, station "I" includes an ejecting member 140 having a cone-engaging means or surface 142.

The ejecting means or member 140 may be pivotally connected as at 144 with a rotatable element 146, the latter being driven through mechanism connected with and operated by the motor (not shown) which drives the conveyor 12. Rotation of the element 146 effects reciprocation of the member 140 so that the ejecting means or surface 142 engages and ejects the filled cone assemblies from the openings in the plates of the conveyor 12 as the cone assemblies are moved into registration with the ejector 140.

As indicated in FIG. 1, the filled cone assemblies 38a are ejected by the arrangement at station "I" onto the upper flight 150 of a second endless conveyor 152 or other means for conveying the ejected cones away from the ejector station. The filled cone assemblies 38a are conveyed by the upper flight 150 of the conveyor 152 into a conventional refrigerated or cold chamber 156 at station "J".

The chamber 156 is maintained at a sufficiently low temperature to effect freezing or congealing of the ice cream and the chocolate composition so that the end product leaving the refrigerated chamber 156 is frozen.

As hereinbefore mentioned, each of the plates 22 of the conveyor construction is equipped with two openings to support two cone assemblies in transverse relation with respect to the direction of movement of the conveyor and each of the stations is equipped with dual apparatus or means for performing identical functions or actions involving two cone assemblies as they are successively moved through the several stations.

The process as exemplified in the series of successive method steps is as follows: The conveyor motor and the activating control means therefor which are of conventional construction are brought into operation by the operator for effecting intermittent or step-by-step movements of the conveyor 12, it being understood that the control mechanism is effective to intermittently and successively stop the conveyor and activate the apparatus at the several stations for the performance of method functions or actions at the several stations.

The two magazines 36 at station "A" are filled with cone assemblies 38 of the character shown in FIG. 5, each cone assembly including a pre-baked sugar cone 40 and a protective cone-shaped shell 42 of paper or the like. A cone assembly 38 is delivered by suitable conventional mechanism (not shown) from each magazine 36 into each opening in a plate or member 22 of the conveyor at station "A", the conveyor being in a fixed position during this operation.

The several other steps of the method are concomitantly being performed at the other stations at the time of delivery of two cone assemblies from the cone supply magazines 36. At station "B", metered amounts of chocolate composition are sprayed by compressed air from the nozzles 52 into the sugar cones 40 to coat the interior surfaces with an impervious coating of chocolate composition.

It is found that a chocolate composition comprising about 70% edible vegetable oil and 30% cocoa and other minor ingredients provides a satisfactory impervious chocolate coating on the inner surfaces of the sugar cones 40 and a topping for the ice cream. The member 88 is moved downwardly to engage the tampers 82 at station "C" with the upper ends of the sugar cones 40 in the manner shown in FIG. 4 to force the sugar cones into contiguous engagement with the inner surfaces of the paper cones 42.

Simultaneously a metered charge or amount of ice cream or ice milk in viscous or semifrozen condition is discharged from the nozzles 94 into the cone assemblies in registration with the nozzles. At the same time metered charges of chocolate topping composition are delivered from tubes 104 at station "E" onto the ice cream or ice milk contained in the cone assemblies in registration with the tubes 104. At station "F" the metering means 110 delivers metered amounts of nut pieces or crushed nuts from the hopper 108 onto the chocolate topping on the ice cream of the cone assemblies.

Simultaneously with these operations the member 116, which is in an uppermost position at which closure members or discs 124 are removed from the magazines 128 by arms 122, is moved downwardly to a position in which the closures carried by the arms 122 are released onto the rims 43 of the paper cones at station "G", and the electrically energized heating units 132 at stations "H" moved downwardly to positions wherein the radiant heat is effective to soften the wax on the covers or closures 124 and adhere the covers onto the paper cones.

When the plates 22 mounting the processed cones 38a are advanced to station "I" the reciprocatory movement of member 140 ejects the filled cone assemlies 38a from the plates 22 onto the conveyor flight 150 of the conveyor 152. The conveyor 152 moves in a right-hand direction conveying the filled cone assemblies into the refrigerating or freezing chamber 156 at station "J" wherein the temperature is sufficiently low to assure solidification of the ice cream and the chocolate.

It is to be understood that while the cone assemblies are preferably filled with a dairy constituent such as ice cream or ice milk, they may be filled with other flavored desserts, such as sherbet, custard or the like. The application onto the ice cream of chocolate topping at station "E" and the delivery of chopped nuts at station "F" may be optional depending upon the end product desired. While the method is described in the formation of frozen products wherein the comestible or sugar cone is of one shape, the method may be utilized in processing frozen desserts wherein the lower end of the sugar cone is configurated with a flat or planar end. A sugar cone of this character may be processed with a pointed paper cone 42 or a similar paper cone with a flat lower end.

It is apparent that, within the scope of the invention, modifications and different arrangements may be made other than as herein disclosed, and the present disclosure is illustrative merely, the invention comprehending all variations thereof.

I claim:

1. Apparatus for processing frozen dessert products including, in combination, movable conveyor means having members for mounting comestible cones, chamber means to receive liquid chocolate composition and compressed air, means connecting the chamber means with a supply of liquid chocolate composition, means connecting the chamber means with a supply of compressed air, the compressed air in the chamber means mixing with and atomizing the chocolate composition in the chamber means, nozzle means associated with the chamber means whereby particles of the liquid chocolate composition atomized by the compressed air are successively delivered by the nozzle means into the interior of the comestible cones providing a coating of the chocolate composition therein, means for delivering a freezable dessert constituent into each of the coated comestible cones, and a cooling chamber associated with the conveyor means for receiving the processed product, said cooling chamber being of a temperature to congeal the dessert constituent.

2. Apparatus for processing frozen dessert products including, in combination, movable conveyor means having members for mounting cone assemblies wherein each cone assembly comprises a comestible cone and a surrounding shell, chamber means to receive liquid chocolate composition and compressed air, means connecting the chamber means with a supply of liquid chocolate composition, means connecting the chamber means with a supply of compressed air, the compressed air in the chamber means mixing with and atomizing the chocolate composition in the chamber means, nozzle means associated with the chamber means whereby particles of the liquid chocolate composition atomized by the compressed air are successively delivered by the nozzle means into the interior of the comestible cones providing a coating of the chocolate composition therein, means for delivering a freezable dessert constituent into each of the comestible cones of the cone assemblies, and a cooling chamber associated with the conveyor means for receiving the processed product, said cooling chamber being of a temperature to congeal the dessert constituent.

3. Apparatus for processing frozen dessert products including, in combination, movable conveyor means having members for mounting cone assemblies wherein each cone assembly comprises a comestible cone and a surrounding shell, chamber means to receive liquid chocolate composition and compressed air, means connecting the chamber means with a supply of liquid chocolate composition, means connecting the chamber means with a supply of compressed air, the compressed air in the chamber means mixing with and atomizing the chocolate composition in the chamber means, nozzle means associated with the chamber means whereby particles of the liquid chocolate composition atomized by the compressed air are successively delivered by the nozzle means into the interior of the comestible cones providing a coating of the chocolate composition therein, means exerting pressure on a comestible cone to establish contiguous engagement of the comestible cone with a surrounding shell, means for delivering a freezable dessert constituent into a coated comestible cone and protective shell assembly, and a cooling chamber associated with the conveyor means for receiving the processed product, said chamber being of a temperature to congeal the dessert constituent.

4. Apparatus for processing frozen dessert products including, in combination, movable conveyor means having members for mounting cone assemblies wherein each cone assembly comprises a comestible cone and a surrounding shell, chamber means to receive liquid chocolate composition and compressed air, means connecting the chamber means with a supply of liquid chocolate composition, means connecting the chamber means with a supply of compressed air, the compressed air in the chamber means mixing with and atomizing the chocolate composition in the chamber means, nozzle means associated with the chamber means whereby particles of the liquid chocolate composition atomized by the compressed air are successively delivered by the nozzle means into the interior of the comestible cones providing a coating of the chocolate composition therein, tamping means engageable with a comestible cone to effect contiguous engagement of the comestible cone with the surrounding shell, means for delivering a freezable dessert constituent into each of the comestible cones, means for applying a closure onto each of the shells, ejector means for removing the processed product from the conveyor, and a chamber for receiving the processed product ejected from the conveyor, said chamber being of a temperature to congeal the dessert constituent.

5. Apparatus according to claim 4 including means for delivering an edible topping material onto the freezable edible constituent in advance of the application of a closure, and means for heat-sealing a closure on a shell.

6. Apparatus for processing frozen dessert products including, in combination, movable conveyor means having members for mounting cone assemblies each comprising an edible sugar cone and a surrounding paper shell, chamber means to receive liquid chocolate composition and compressed air, means connecting the chamber means with a supply of liquid chocolate composition, tubular means connecting the chamber means with a supply of compressed air, the compressed air in the chamber means mixing with and atomizing the chocolate composition in the chamber means, nozzle means connected with the chamber means whereby particles of the liquid chocolate composition atomized by the compressed air are delivered into the edible sugar cone forming a substantially impervious coating of chocolate composition in the sugar cone, means exerting pressure on an edible sugar cone for establishing contiguous engagement of the sugar cone with the paper shell, tubular means for delivering a freezable dessert constituent into the interior of an assembly of edible sugar cone and paper shell, second tubular means for delivering an edible topping material onto the dessert constituent, and a chamber receiving the processed products from the conveyor means, said chamber being at a temperature sufficient to congeal constituents of the product.

7. Apparatus for processing frozen dessert products including, in combination, intermittently movable conveyor means having members for mounting comestible cones, chamber means to receive liquid chocolate composition and compressed air, first tubular means connecting the chamber means with a supply of liquid chocolate composition, second tubular means connecting the chamber means with a supply of compressed air, means associated with the first tubular means for metering successive charges of the liquid chocolate composition to the chamber means, valve means intermittently opened to deliver compressed air from the supply to the chamber means, the compressed air admitted to the chamber means mixing with and atomizing the successive charges of liquid chocolate composition in the chamber means, nozzle means associated with the chamber means whereby particles of the liquid chocolate composition atomized by the compressed air are delivered into the interior of the comestible cones as they are successively moved by the conveyor into registration with the nozzle means, and means for delivering a freezable dessert constituent into each of the comestible cones.

8. Apparatus for processing frozen dessert products including, in combination, movable conveyor means having members for mounting cone assemblies each comprising an edible sugar cone and a surrounding paper shell, chamber means to receive liquid chocolate composition and compressed air, first tubular means connecting the chamber means with a supply of liquid chocolate composition, second tubular means connecting the chamber means with a supply of compressed air, means associated with the first tubular means for metering successive charges of the liquid chocolate composition to the chamber means, valve means associated with the second tubular means, said valve means being intermittently opened to deliver compressed air to the chamber means, the compressed air admitted to the chamber means mixing with and atomizing the successive charges of liquid chocolate composition in the chamber means, nozzle means associated with the chamber means whereby particles of the liquid chocolate composition atomized by the compressed air are delivered into the interior of the comestible cones as they are successively moved by the conveyor into registration with the nozzle means, tamping means for exerting pressure on the edible sugar cone establishing contiguous engagement of the sugar cone with the paper shell, means for delivering a freezable dessert constituent into the interior of an assembly of edible sugar cone and paper shell, and a cooling chamber receiving the processed product from the conveyor means, said cooling chamber being at a temperature sufficient to congeal the constituents of the product.

9. Apparatus according to claim 8 including means for delivering an edible topping onto the dessert constituent in the cones, means for applying closures on the cone assemblies, and means adhering the closures to the paper shells.

* * * * *